United States Patent [19]

Kramer et al.

[11] Patent Number: 4,791,801
[45] Date of Patent: Dec. 20, 1988

[54] REVERSIBLE FUEL ASSEMBLY GRID TAB REPAIR TOOL

[75] Inventors: Arthur W. Kramer, Murrysville Boro; Vytautas J. Mickus, Monroeville Boro, both of Pa.

[73] Assignee: Westinghouse Electric Corp., Pittsburgh, Pa.

[21] Appl. No.: 80,928

[22] Filed: Aug. 3, 1987

[51] Int. Cl.4 .......................... G21C 19/00; B21D 9/00
[52] U.S. Cl. ........................................ 72/387; 376/260
[58] Field of Search .................. 376/261, 260; 72/386, 72/322, 470, 316, 409, 387; 29/400 N, 723, 505, 283.5, 402.19

[56] References Cited
U.S. PATENT DOCUMENTS

| | | |
|---|---|---|
| 3,057,233 | 10/1962 | Turner . |
| 3,180,138 | 4/1965 | Faulkner . |
| 3,303,685 | 2/1967 | Conran et al. ........................ 72/386 |
| 3,570,299 | 3/1971 | Wieters . |
| 4,356,716 | 11/1982 | Aschauer . |
| 4,427,622 | 1/1984 | Knecht et al. ...................... 376/260 |
| 4,428,903 | 1/1984 | Kasik et al. . |
| 4,590,671 | 5/1986 | Havoic-Conroy . |
| 4,614,106 | 9/1986 | Forget . |
| 4,624,042 | 11/1986 | Green . |
| 4,642,871 | 2/1987 | Ookubo et al. . |
| 4,704,246 | 11/1987 | Hornak ................................ 376/260 |
| 4,711,436 | 12/1987 | Kobuck et al. ..................... 376/261 |
| 4,736,613 | 4/1988 | Dailey ................................. 376/260 |

Primary Examiner—Charles T. Jordan
Assistant Examiner—Daniel Wasil

[57] ABSTRACT

Reversible fuel assembly grid tab repair tool having a tab bending member for remotely reforming fuel assembly grid tabs, wherein the tool has means for fine alignment of the tab bending member with the grid tab to be reformed. The grid tabs may be formed on the top and bottom edges of a grid strap which wraps a plurality of fuel rods disposed in the fuel assembly. The repair tool comprises a generally L-shaped frame having a vertical first leg and a horizontal second leg. Extending from the terminal end of the second leg is an alignment blade capable of being interposed between two fuel rods adjacent each side of the grid tab to be reformed. Attached to the top surface of the second leg at the terminus thereof is an anvil block having an anvil surface for bending the grid tab thereagainst when the grid tab is interposed between the anvil surface and the tab bending member. Extending from the anvil surface are a plurality of register pins capable of abutting the top and bottom edges of the grid strap for fine alignment of the tab bending member with the grid tab. A lever member pivotally connected to the repair tool is capable of translating the grid tab bending member towards the anvil surface for bending the grid tab against the anvil surface when the grid tab is interposed between the tab bending member and the anvil surface.

17 Claims, 9 Drawing Sheets

REVERSIBLE FUEL ASSEMBLY GRID TAB REPAIR TOOL

BACKGROUND OF THE INVENTION

This invention relates to nuclear power reactor fuel assembly repair and more particularly to a reversible fuel assembly grid tab repair tool having a bending member for remotely reforming fuel assembly grid tabs, wherein the tool has means for fine alignment of the bending member with the grid tab to be reformed.

A nuclear power reactor is an apparatus for producing heat by the controlled fission of fissile nuclear material such as uranium-235. The nuclear material is typically formed into relatively small cylindrical fuel pellets which are stacked end to end in an elongated hollow cylindrical fuel rod which serves as cladding for the fuel rods. In the case of a pressurized water reactor, a plurality of fuel rods are bundled together by a plurality of rectangular grids each grid having generally rectangular cells therethrough for receiving each fuel rod so that the distance between fuel rods in adjacent cells obtains a predetermined pitch. The grids, which are fastened to a plurality of guide thimble tubes disposed in the fuel assembly, which thimble tubes extend the length of the fuel rods, are spaced along the length of the fuel rod bundle for securing the fuel rods in the bundle configuration by the friction engagement of a plurality of grid dimples which are integrally attached to each grid cell. A plurality of grid tabs are integrally attached to a rectangularly-shaped grid strap which wraps the outermost perimeter of the grid cells and thus binds the fuel rods in the grid. The grid tabs assist in directing cooling water flow over the fuel rods. The top and bottom of the fuel rod bundle are connected to a top nozzle and a bottom nozzle respectively for providing structural support to the fuel rod bundle. The combination of the fuel rod bundle, guide thimble tubes, grids, top nozzle and bottom nozzle form a fuel assembly. A plurality of fuel assemblies are disposed in a predetermined pattern in a nuclear reactor core which is positioned in a reactor pressure vessel. Heat due to fission of the nuclear fuel is carried away from the fuel assemblies by water circulating over each fuel assembly, which heat is transferred to a turbine for generating electricity in a manner well known in the art of nuclear power production.

On occasion, a nuclear fuel rod requires replacement prior to the end of the operating life of the fuel rod. For example, the fuel rod may experience localized rod cladding breakage. Such breakage may be caused, for instance, by a phenomenon known in the art as baffle jetting wherein high pressure coolant water jets through a deformed joint of a core baffle which surrounds the reactor core and impinges one or more of the fuel rods located near the joint. If this happens, a fuel rod near the deformed joint may experience cladding damage due to the force of the impinging water. Such a joint must be reformed and the damaged fuel rod must be replaced with an undamaged fuel rod to avoid release of radioactive material from the damaged fuel rod into the cooling water.

After the damaged fuel rod is withdrawn from its fuel assembly grid cell, an undamaged fuel rod is inserted into that cell. However, occasionally a fuel assembly grid tab, which is attached to the grid strap, is unintentionally deformed or bent when the undamaged fuel rod is inserted into a fuel assembly grid cell located adjacent the grid tab. In this manner, grid tabs may become bent from a nominal 43 degrees to as much as 90 degrees or more. When a grid tab is deformed in the manner described immediately above, the replacement fuel rod may vibrate against its adjacent deformed grid tab during reactor operation thereby increasing the likelihood that the bent grid tab may damage the fuel rod cladding. The vibration of the fuel rod is caused by the velocity and force of the coolant water flowing through and about the grid during reactor operation.

Therefore, to preclude the possible undesirable effects of such a bent grid tab, the grid tab must be reformed by bending the grid tab so that the grid tab can not vibrate against the fuel rod in a manner which can cause fuel rod cladding damage. An appropriate grid tab crimping or bending tool capable of being remotely operated may be used for this purpose.

A crimping tool adapted for crimping the edges of a panel for an automobile or the like is disclosed in U.S. Pat. No. 3,180,128, invented by O. V. Faulkner and issued Apr. 27, 1965. The Faulkner device comprises an elongated cylindrical body member having an elongated actuating member extending through the cylindrical body. A laterally projecting crimping element is carried by the actuating member in position to extend in spaced, parallel relation to a transverse plate which is carried by the cylindrical body member. The panel to be crimped is engaged between a relatively small crimping element and a relatively wide holding surface, thereby preventing damage to a finished surface which is placed in contact with the holding surface. The crimping element is urged by spring means away from the transverse plate whereby the crimping element always returns to a position to receive a member to be crimped. An adjustable stop means is also provided for varying the effective length of the actuating member. Although the Faulkner patent discloses a crimping tool most applicable to automobile panels, the Faulkner patent does not appear to disclose a tool suitable for bending or crimping a nuclear fuel assembly grid tab in the manner of the present invention which is a remotely operable and reversible fuel assembly grid tab repair tool.

U.S. Pat. No. 4,614,106 issued Sept. 30, 1986 to D. Forget and entitled "Tab Lifting And Crimping Tool" discloses a tab lifting tool suitable for use on radiators of a type commonly used to cool motor vehicle engine cooling water. The tool includes a casing having a pair of openings at opposite ends thereof and an elongated tool channel inside the casing which communicates with the openings. An elongated tool member slidably mounted in the tool channel has a tab lifting finger proximate a tab lifting end of the casing and a tab crimping face proximate a tab crimping end of the casing. A flange gripping finger is affixed to the tab crimping end of the casing while a trigger is pivotally mounted in the casing. Biasing means are also located in the casing and engage the tool member for urging the tab lifting finger away from the casing and the tab crimping face towards the casing. Even though the Forget patent discloses a tool for lifting and crimping automobile radiator tabs, the Forget patent does not appear to disclose a tool for remotely bending or crimping a nuclear fuel assembly grid tab in the fashion of the present invention.

U.S. Pat. No. 3,570,299 issued Mar. 16, 1971 to A. W. Wieters and entitled "Internal Duct Crimper" discloses a crimping device for bending and clenching edges of laterally extending ducts to main ducts including a bifurcated arm structure with a clenching device and anvil provided on the end of one of the arms with means for shifting the clenching member into clenching position against the anvil through the utilization of a connected arm and lever device. The apparatus provides a duct crimper wherein the crimping mechanism, including a shoe and anvil device, is carried completely on one leg of the unit. Although the Wieters patent discloses a tool for bending and clenching edges of laterally extending ducts to main ducts, the Wieters patent does not appear to disclose a reversible device configured for remotely bending or reforming nuclear fuel assembly grid tabs as provided by the present invention.

A remotely operable device for studying fission gases generated within fuel rods during reactor operation is disclosed by U.S. Pat. No. 4,428,903 issued Jan. 31, 1984 in the name of James E. Kasik et al. and entitled "Fuel Rod Fission Gas Crimping Arrangement And Method". To study these gases, irradiated fuel rods are individually punctured in a subaqueous environment to release the fission gases for capture and examination. In this regard, a selected fuel rod is withdrawn from its bundle for penetration. After withdrawal from the bundle, and after penetration and capture of fission gas, the selected fuel rod is stored underwater for an indefinite period of time. The Kasik et al. device remotely and sealingly crimps a malleable sleeve over the puncture hole through which fission gases escape in order to prevent further release of fission gasses when the fuel rod is stored. According to the Kasik et al. disclosure, a hydraulically operated crimping mechanism forms a pair of sealing ridges (one on each side of the puncture hole) between the malleable sleeve and the punctured fuel rod by crimping the malleable sleeve with its jaws. At the appropriate moment, the jaws clench, securing the malleable sleeve onto the fuel rod and over the puncture hole. Although the Kasik et al. patent discloses a remotely operable crimping tool suitable for use on a nuclear fuel assembly component (e.g., a nuclear fuel rod), the Kasik et al. patent does not appear to disclose a reversible tool having a bending means for reforming a fuel assembly grid tab in combination with a spring biasing means connected to the bending means and does not appear to disclose an anvil surface on the tool against which the grid tab can be bent or reformed. Moreover, the Kasik et al. patent does not appear to disclose a device having means for fine alignment of a bending mechanism with the grid tab to be reformed.

Consequently, while the prior art discloses crimping devices for crimping elements or tabs, the prior art does not disclose a reversible device having a bending member which is suitable for remotely bending or reforming a fuel assembly grid tab, wherein the device has means for fine alignment of the bending mechanism with the grid tab to be reformed.

Therefore, what is needed is a reversible fuel assembly grid tab repair tool having a bending member for remotely reforming a fuel assembly grid tab, wherein the repair tool has means for fine alignment of the bending member with the grid tab to be reformed.

SUMMARY OF THE INVENTION

Disclosed herein is a reversible fuel assembly grid tab repair tool having a hook-shaped grid tab bending member for remotely bending or reforming deformed fuel assembly grid tabs, wherein the repair tool includes means for fine alignment of the grid tab bending member proximate the grid tab to be bent or reformed. The grid tabs may be disposed on the top and bottom edges of a grid strap which wraps a plurality of fuel rods disposed in the fuel assembly. The repair tool comprises a frame having an outwardly extending alignment blade which is capable of being interposed between two fuel rods adjacent each side of the grid tab for fine alignment of the bending member proximate the grid tab. The repair tool further comprises an anvil surface thereon for bending the grid tab thereagainst, the anvil surface having a plurality of outwardly extending register pins sized to matingly abut either the top or the bottom edge of the grid strap on each side of the grid tab to be reformed for fine alignment of the bending member proximate the grid tab. A lever member, which is pivotally connected to the frame and fixedly attached to the bending member, translates the bending member towards the anvil surface, when the lever member is pivoted, so that the grid tab bends if the grid tab is interposed between the bending member and the anvil surface. The repair tool includes a biasing means for biasing the bending member away from the anvil surface to receive another grid tab to be bent.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENT

Occasionally, a damaged nuclear fuel rod requires replacement prior to the end of the operating life of the fuel rod. The fuel rod is replaced in order to decrease the likelihood of radioactive material escaping the damaged fuel rod. However, when a replacement fuel rod is inserted into the location previously occupied by the damaged rod, the replacement fuel rod may be inserted in a manner such that a grid tab proximate the location is inadvertently deformed. If the deformed grid tab vibrates against the replacement fuel rod during reactor operation, the grid tab could damage the replacement fuel rod unless the grid tab is reformed or bent so that the replacement fuel rod does not vibrate against the deformed grid tab.

Figure 1:
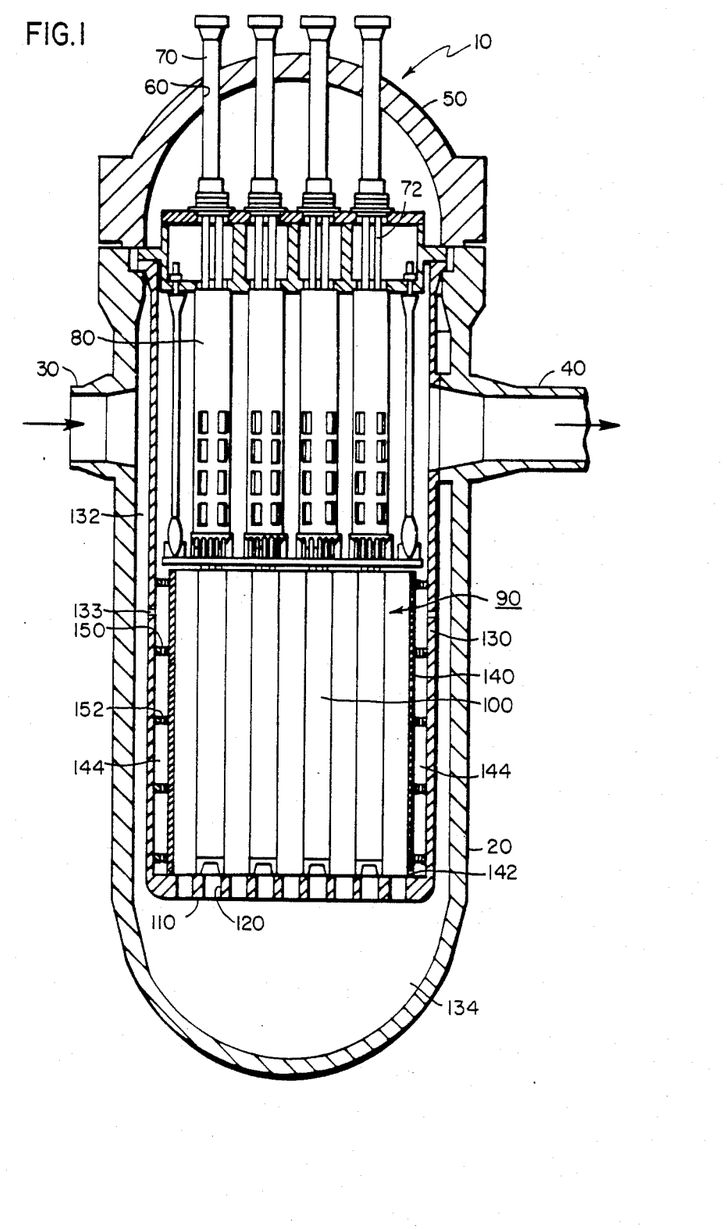
FIG. 1 is a view in vertical cross section of a reactor pressure vessel with parts removed in the interest of clarity showing a plurality of fuel assemblies disposed therein.

Referring to FIG. 1, a nuclear reactor pressure vessel is referred to generally as 10, and includes a reactor vessel shell 20 having a plurality of inlet nozzles 30 and outlet nozzles 40 disposed in the upper portion thereof. A hemispherical closure head 50 is mounted on the top of vessel shell 20 and is sealingly attached, which may be by bolting, to the top of vessel shell 20 so that closure head 50 completely and sealingly caps vessel shell 20 for preventing escape of radioactivity from pressure vessel 10 when the nuclear reactor is operating. Interposed between closure head 50 and vessel shell 20 is at least one O-ring seal (not shown) for providing a seal-tight relation between closure head 50 and vessel shell 20 when closure head 50 is bolted to vessel shell 20. Disposed through the top of closure head 50 are a plurality of closure head openings 60 for receiving a plurality of thermal sleeves 70 therethrough, which thermal sleeves 70 each house a control rod drive shaft (not shown) extending from above thermal sleeve 70 to a drive rod 72 which is in turn connected to a control rod cluster (not shown) for controlling the power level of the reactor core in a manner well known in the art of nuclear power production. Each control rod cluster is movably disposed in a control rod guide tube 80 which surrounds the control rod cluster. Disposed in vessel shell 20 is a nuclear reactor core generally referred to as 90, comprising a plurality of nuclear fuel assemblies 100 arranged in a predetermined core pattern 102 (see FIG. 2), which fuel assemblies 100 each include a plurality of nuclear fuel rods 160 (see FIGS. 3 and 4). Each fuel assembly 100 is supported on a horizontal lower core plate 110 having a plurality of coolant flow orifices 120 therethrough for flow of coolant through the orifices 120 to fuel assemblies 100 so that heat due to fission generated in fuel assemblies 100 is transferred from fuel assemblies 100 to the coolant flowing through and about each fuel assembly 100. Lower core plate 110 is connected to a barrel-shaped core barrel 130 which is disposed between the vessel shell 20 and reactor core 90 such that an annular downcommer region 132 is defined between vessel shell 20 and core barrel 130. In nuclear power reactors having a conventional "downflow" configuration, core barrel 130 includes a set of lateral flowports 133 therethrough. The lower portion of vessel shell 20 defines a lower plenum 134 beneath lower core plate 110, which lower plenum 134 is in communication with the bottom end of downcommer region 132 and coolant flow orifices 120. Surrounding reactor core 90 is a generally cylindrical core baffle shell 140 which is interposed between core barrel 130 and reactor core 90, so that an annular lower core flow opening 142 is defined between lower core plate 110 and core baffle shell 140. Core baffle shell 140 and core barrel 130 are arranged so that an annular baffle region 144 is defined therebetween. Core baffle shell 140 is connected to core barrel 130 by a plurality of horizontal former plates 150 having a plurality of former plate holes 152 therethrough for passage of coolant water, which former plates 150 are disposed along the length of core baffle shell 140 and laterally interposed between core baffle shell 140 and core barrel 130 for laterally supporting core baffle shell 140. Core baffle shell 140 comprises a plurality of elongated vertical panels joined, which may be by bolting, at a plurality of abutting vertical baffle edges or abutting joints thereof such that the horizontal cross section of core baffle shell 140 conforms to the horizontal cross section of core pattern 102 as shown in FIG. 2.

Still referring to FIG. 1, during reactor operation the control rods (not shown) are withdrawn from the reactor core 90 and into control rod guide tubes 80 thus allowing pellets of fissile material, such as uranium-235, disposed in each fuel rod 160 (see FIGS. 3 and 4) to undergo fission for producing heat in a manner well known in the art. Water coolant enters inlet nozzle 30 and flows downwardly through downcommer region 132, into lower plenum 134 and upwardly through coolant flow orifices 120. The coolant water flow path then splits into two major portions whereby the first portion flows upwardly through fuel assemblies 100 while the second portion flows upwardly through lower core flow opening 142 and into annular baffle region 144. As the second portion of coolant water flows upwardly through baffle region 144, the second portion of coolant water passes through former plate holes 152 formed through former plates 150 and combines with the first portion of coolant water exiting reactor core 90 and thereafter leaves pressure vessel 10 through outlet nozzle 40. However, in reactors having the "downflow" configuration a portion of the water coolant flowing downwardly through downcommer region 132 enters lateral flowport 133 and flows downwardly through former plate holes 152 to lower plenum 134. As the coolant water flows through fuel assemblies 100, heat due to fission is carried away from fuel assemblies 100 by the coolant water circulating through each fuel assembly 100, which heat is transferred to a turbine for generating electricity in a manner well known in the art of nuclear power production.

Figure 2:
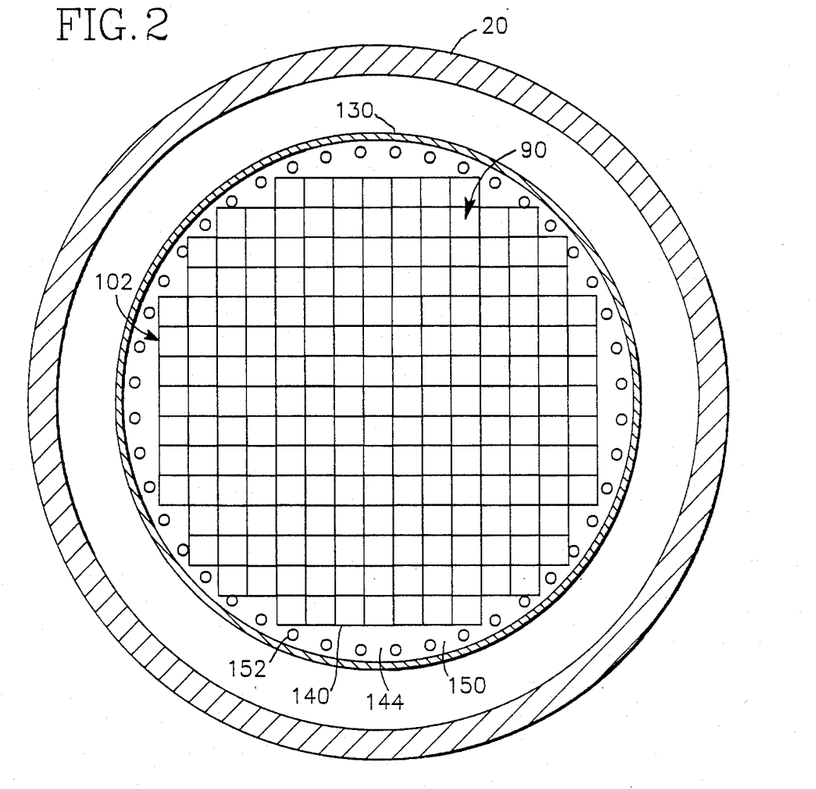
FIG. 2 is a view in horizontal cross section of the reactor pressure vessel illustrating the plurality of fuel assemblies arranged in a reactor core.

Referring to FIG. 2, in reactors having the downflow configuration, a pressure differential exists across baffle shell 140 between the water coolant flowing downwardly through former plate holes 152 and the coolant flowing upwardly through coolant flow orifices 120. If the vertical panels of core baffle shell 140 are joined by bolting, relatively small gaps may exist between two adjacent vertical panels. The pressure differential, which may be approximately 25 psi, causes relatively high pressure coolant streams to jet through the gap and into reactor core 90 by a process known in the art as baffle jetting. The coolant jetting through the gap may impinge at least one of fuel rods 160 (see FIG. 3) disposed in fuel assembly 100 thereby increasing the likelihood that fuel rod 160 is damaged as it vibrates against fuel assembly 100 due to the force of the impinging coolant. A fuel rod 160 which may be damaged in the manner described immediately above can be replaced by extracting from reactor core 90 fuel assembly 100 containing the damaged fuel rod 160 and placing the fuel assembly 100 in a spent fuel pool (not shown) so that the damaged fuel rod 160 may be retrieved from fuel assembly 100 and replaced by an undamaged fuel rod 160. After damaged fuel rod 160 is replaced in fuel assembly 100, which may be by a process known in the art as fuel reconstitution, and after the gap is closed, fuel assembly 100 is replaced into reactor core 90.

Figure 3:
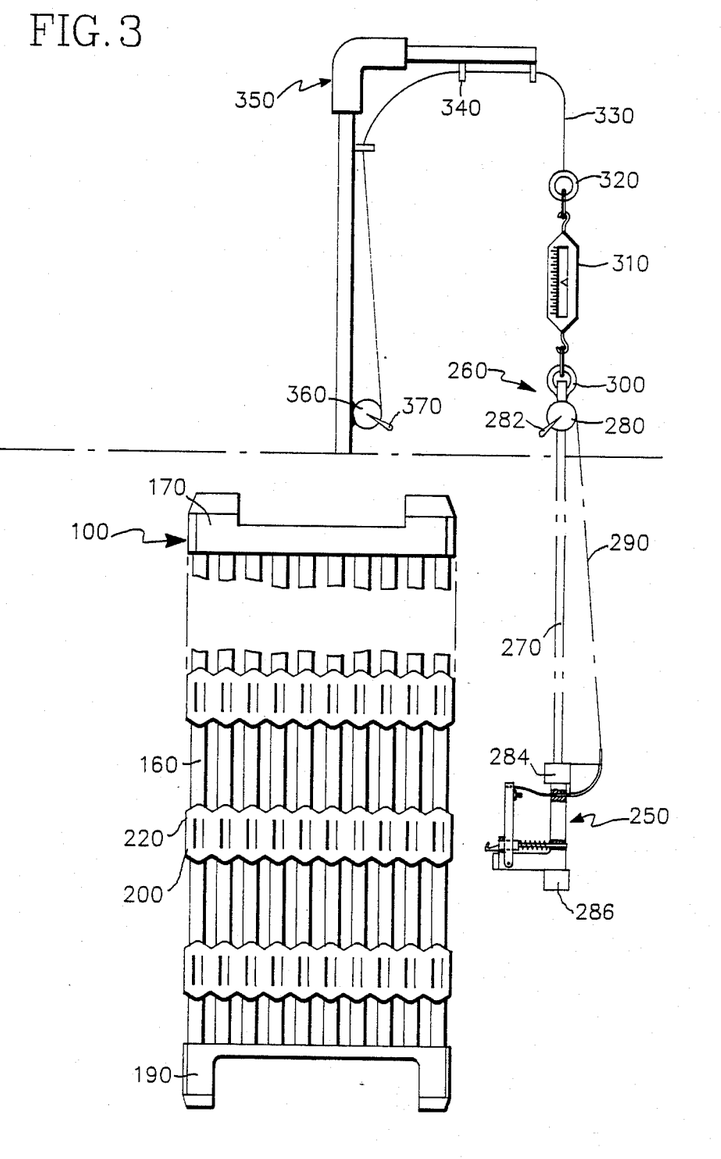
FIG. 3 displays a fuel assembly having a fuel assembly grid strap and illustrates a reversible fuel assembly grid tab repair tool disposed nearby.
Figure 4:
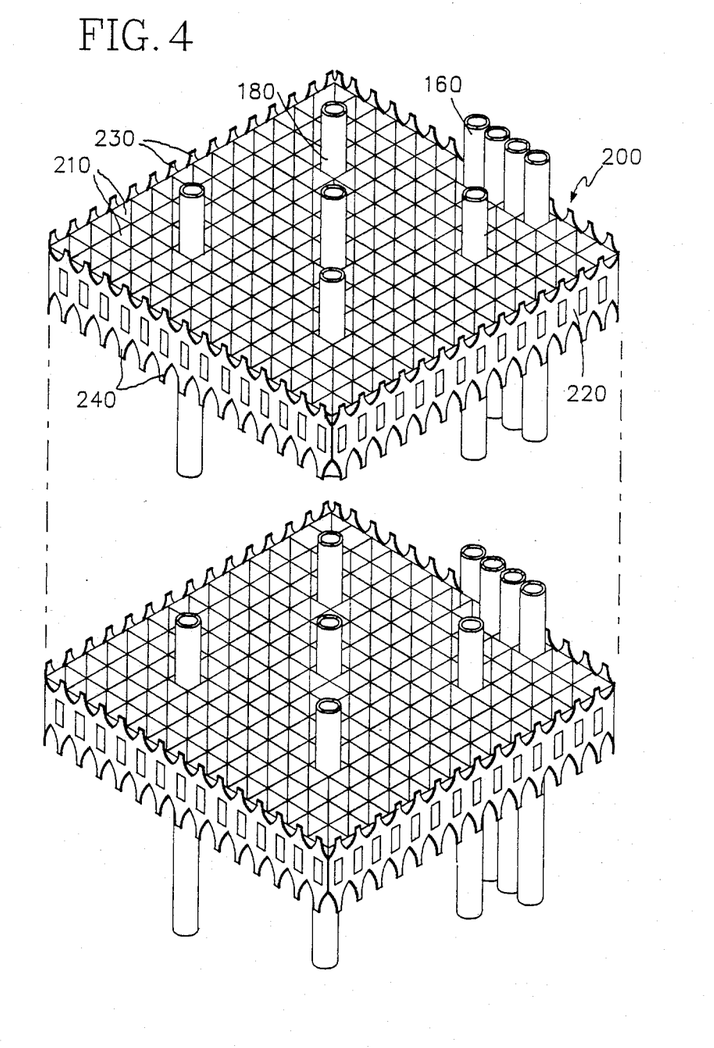
FIG. 4 is a view in perspective of a fuel assembly grid having a plurality of nuclear fuel rods and guide thimble tubes therethrough.

Referring to FIGS. 3 and 4, there is shown fuel assembly 100 having the plurality of fuel rods 160 disposed therein and comprising a generally rectangular fuel assembly top nozzle 170 connected to a plurality of elongated fuel assembly guide thimble tubes 180 which are in turn connected to a generally rectangular fuel assembly bottom nozzle 190, which thimble tubes 180 extend from top nozzle 170 to bottom nozzle 190. Spaced along the length of fuel assembly 100 are a plurality of generally rectangular fuel assembly grids 200 having a plurality of generally rectangular grid cells 210 formed therein for receiving each fuel rod 160 and thimble tube 180 therethrough. Each grid cell 210 having a thimble tube 180 passing therethrough is attached, which may be by welding, to that thimble tube 180. Each grid cell 210 having a fuel rod 160 passing therethrough has a plurality of grid dimples (not shown) formed in each grid cell 210 for providing frictional contact between the grid dimples and fuel rod 160 so that each fuel rod 160 is sufficiently secured thereby in the corresponding grid cell 210. A generally rectangular fuel assembly grid strap 220 wraps the outermost perimeter of grid cells 210 for binding fuel rods 160 and thimble tubes 180 in grid 200. Formed along the topmost and bottommost edges of grid strap 220 are a plurality of generally frusto-triangular fuel assembly first grid tabs 230 and second grid tabs 240 respectively, which grid tabs 230 and 240 may measure approximately 3/16 inches by 3/16 and approximately 0.010 inch in thickness. Occasionally, during the fuel assembly reconstitution process referred to above, a grid tab 230 or 240 is unintentionally bent or deformed if replacement fuel rod 160 inadvertently impacts grid tab 230 or 240 when replacement fuel rod 160 is inserted through grid cell 210. Such a grid tab 230 or 240 may be deformed or inadvertently bent from a nominal position of approximately 43 degrees to as much as 90 degrees or more, such that grid tab 230 or 240 becomes capable of vibrating against replacement fuel rod 160 after fuel rod 160 is inserted into fuel assembly 100. If fuel assembly 100 having the deformed grid tab 230 or 240 were replaced into reactor core 90, flow induced vibration of fuel rod 160 due to water coolant flowing through fuel assembly 100 and past fuel rod 160 might cause grid tab 230 or 240 to wear through the cladding of fuel rod 160. If the cladding is worn through in this manner, radioactive material may be released into the water coolant flowing past fuel rod 160 unless grid tab 230 or 240 is reformed or bent so that grid tab 230 or 240 does not vibrate against fuel rod 160.

Referring again to FIGS. 3 and 4, disposed near grid strap 220 is the subject matter of the present invention which is a reversible fuel assembly grid tab repair tool 250 for remotely reforming or bending deformed grid tabs 230 or 240. As shown in FIG. 3, repair tool 250 is connected to a repair tool support assembly 260, which supports repair tool 250. In a manner described below, repair tool 250 is coupled either by a first coupling member 284 having internal first threads 285 (see FIG. 5) or a second coupling member 286 having internal second threads 287 (see FIG. 5) to a support pipe or rod 270 having external threads on the lower most end thereof for threadably engaging first threads 285 or second threads 287. Attached to support pipe 270 is a tensioning first pulley 280 having a first pulley handle 282 connected thereto for tensioning a first cable 290 extending from first pulley 280 to repair tool 250. A first connector 300 is attached, which may be by welding, to the upper portion of pipe support 270 for connecting pipe support 270 to an elastic means 310, which may be a spring. Elastic means 310 provides a relatively small elastic vertical movement to pipe support 270 and thus to repair tool 250 for gentle fine alignment of repair tool 250 with grid tab 230 or 240. A second connector 320 connects elastic means 310 to a second cable 330 which passes through at least one cable support 340, which may be a ring, attached, which may be by welding, to a movable crane 350 that is capable of laterally positioning support assembly 260 and thus capable of laterally positioning repair tool 250 near grid tab 230. Movable crane 350 which is located above the spent fuel pool (not shown) in which fuel assembly 100 is disposed, is capable of swivelling about its vertical axis in a 360 degree circle parallel to a spent fuel pool floor (not shown) for laterally positioning repair tool 250 near grid tab 240. Attached to movable crane 350 is a tensioning second pulley 360 engaging second cable 330, which second pulley 360 has a second pulley handle 370 connected thereto for vertically positioning support assembly 260 and thus for vertically positioning repair tool 250 near grid tab 230.

Figure 5:
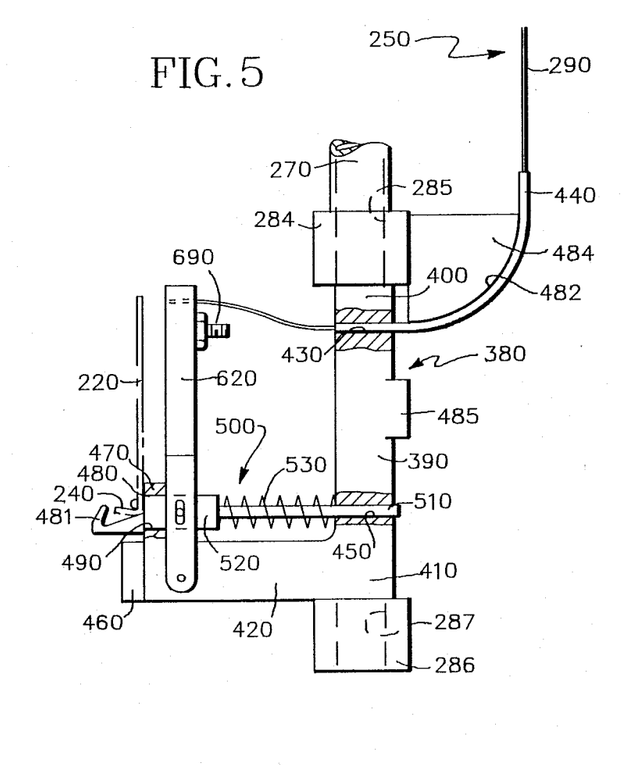
FIG. 5 is a view in partial vertical section illustrating the grid tab repair tool.
Figure 6:
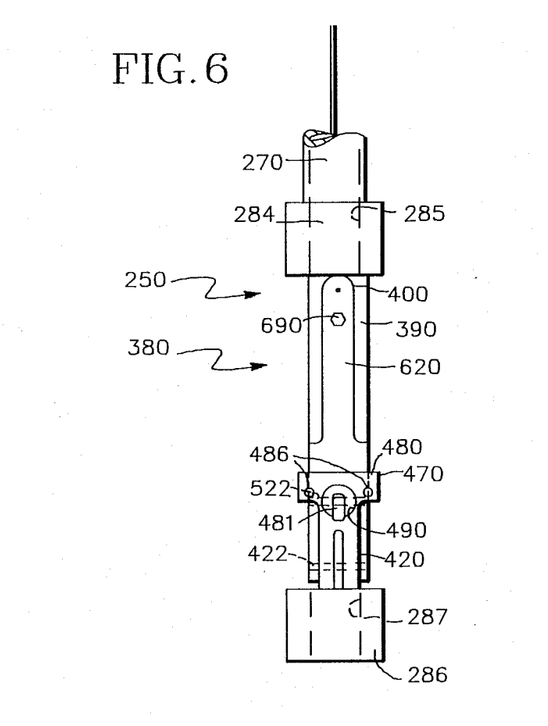
FIG. 6 is a plan view of the grid tab repair tool.
Figures 6A, 6B, 6C:
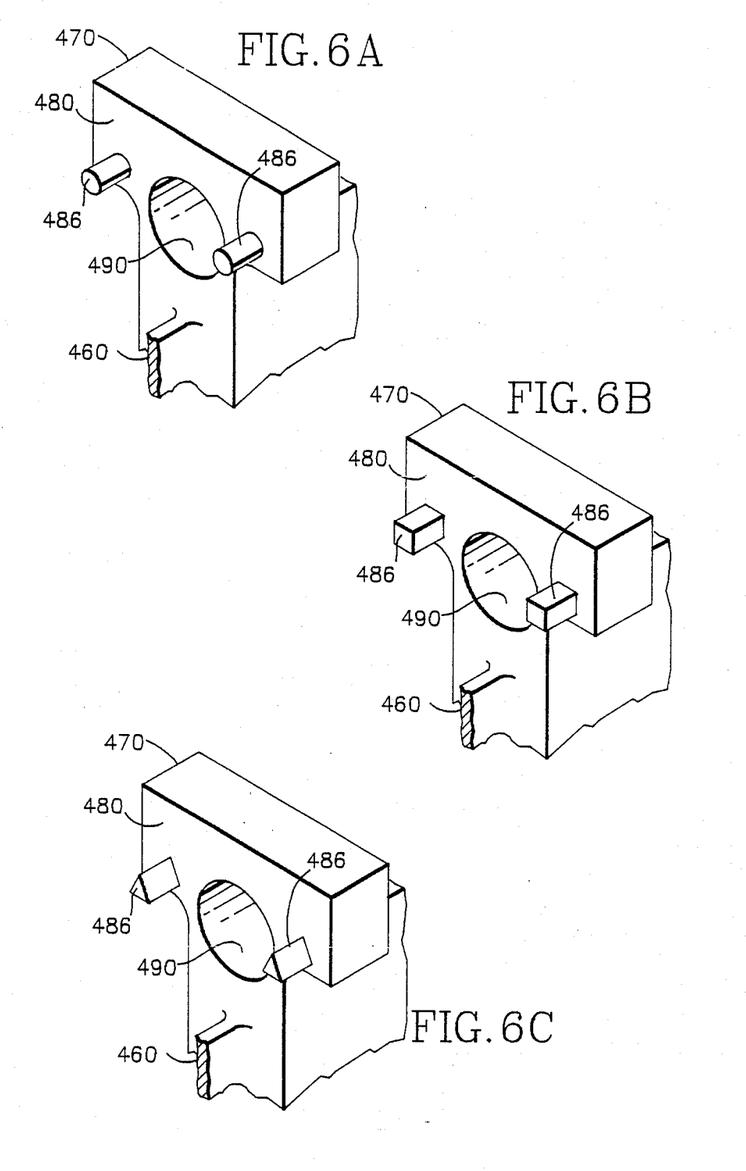
FIGS. 6A–6C show a view in perspective of the anvil and register pin
Figure 7:
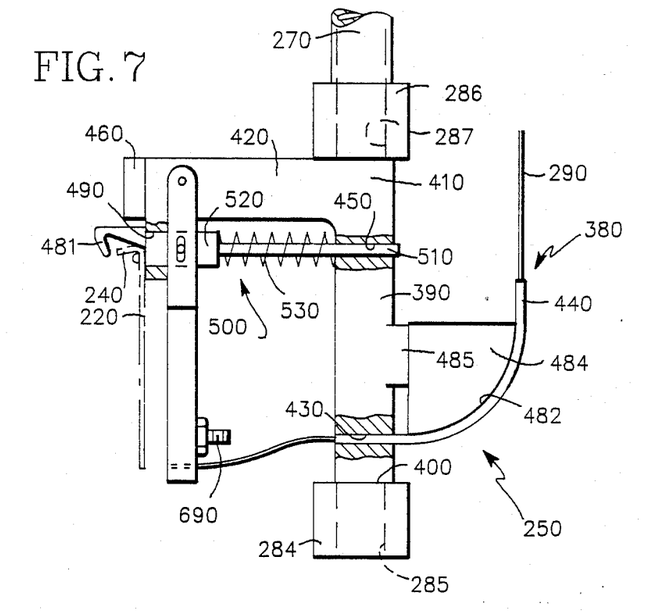
FIG. 7 is a view in partial vertical section illustrating the grid tab repair tool reversed.

Referring now to FIGS. 5 and 6, there is illustrated the reversible fuel assembly grid tab repair tool 250 comprising a generally L-shaped frame 380, which may be 304 stainless steel, having a vertical first leg 390, which first leg 390 includes a first end 400 and a second end 410. Integrally attached to second end 410 is a horizontal second leg 420 having a transverse first bolt hole 422 (see FIG. 6) therethrough, which second leg 420 may be an elongated rectangle approximately 1.8 inches long and approximately 1.13 inch wide and approximately 0.53 inch thick, and which second leg 420 is disposed perpendicular to first leg 390. Formed near first end 400 and through first leg 390, which may be an elongated rectangle approximately 5.0 inches long and approximately 1.0 inch square in cross-section, is a first bore 430 aligned parallel to second leg 420 and disposed in the same vertical plane with second leg 420 for receiving a hollow cable guide tube 440 having first cable 290 therethrough, which cable guide tube 440 may be a 304 stainless steel tube defining an arc having a radius of approximately 2.0 inches. Formed near second end 410 and through first leg 390 and above second leg 420 is a second bore 450, which second bore 450 is aligned parallel to first bore 430 in the same vertical plane with first bore 430. Integrally attached to second leg 420 at the terminus thereof is a vertical elongated rectangular alignment blade 460, which may be approximately 0.37 inch long and 1.0 inch wide and 0.80 inch thick. Alignment blade 460 is capable of being interposed between adjacent fuel rods 160 for fine alignment of repair tool 250 opposite grid tab 230 or 240. Integrally connected to the top surface of second leg 420 at the end thereof is a horizontal generally rectangular anvil block 470 (see FIG. 6) having a flat vertical anvil surface 480 (see FIG. 6A) thereon for bending grid tab 230 thereagainst and having a third bore 490 therethrough aligned with second bore 450. Anvil block 470 may be approximately 1.5 inches long, 0.50 inch wide and 0.31 inch thick. Attached, which may be by welding, to first end 400 is first coupling member 284 having internal first threads 285 therein capable of matingly engaging the external threads of support pipe 270 for coupling repair tool 250 to support pipe 270. First coupling member 284 may be a cylinder 1.62 inches in outside diameter, one inch in inside diameter and 1.25 inch long. Moreover, attached, which may be by welding, to second end 410 is second coupling member 286 having internal second threads 287 therein capable of matingly engaging the external threads of support pipe 270 for coupling repair tool 250 to support pipe 270. Second coupling member 286 may be a cylinder 1.62 inches in outside diameter, one inch in inside diameter and 1.25 inches long. Thus, either first coupling member 284 or second coupling member 286 is capable of coupling repair tool 250 to support pipe 270 thereby enabling repair tool 250 to be reversed 180 degrees so that either grid tab 230 or 240 may be reformed by repair tool 250 as illustrated in FIG. 7. When repair tool 250 is reversed 180 degrees, cable guide tube 440 having a portion of first cable 290 therethrough swivels 180 degrees in first bore 430.

As best seen in FIGS. 5 and 7, attached, which may be by welding, to an inside curved portion 482 of cable guide tube 440 is a cable guide tube bracing plate 484 for bracing cable guide tube 440 against the external surface of first coupling member 284. Bracing plate 484, which is quarter-circle shaped and attached, which may be by welding, to cable guide tube 440 along its curved edge, is capable of swivelling with cable guide tube 440 when cable guide tube 440 swivels in first bore 430. Integrally attached, which may be by welding, to first leg 390 and aligned with first bore 430 is a bracing plate support 485 for supporting bracing plate 484 when repair tool 250 swivels 180 degrees.

As indicated in FIG. 6, a plurality of register pins 486 extend outwardly from anvil surface 480 for fine alignment of a hook-shaped tab bending member 481 opposite grid tab 230 or 240. Register pins 486 may be approximately 0.1876 inch or 0.1882 inch in diameter and approximately 0.43 inch long. In another embodiment, register pins 486 may be approximately 0.1256 inch or 0.1262 inch in diameter and approximately 1.0 inch long. Alternatively, register pins 486 may be generally rectangular-shaped pins 487 (see FIG. 6B) or triangular-shaped pins 488 (see FIG. C6) cross section. The cross section and length of register pins 486 should be of a cross section and length for sufficiently aligning tab bending member 481 opposite grid tab 230 or 240. Register pins 486 are anchored in a plurality of register pin holes (not shown) formed in anvil surface 480 and extend from anvil surface 480 a sufficient distance, which may be a distance of approximately 0.31 inch, for abutting the edge of grid strap 220 on either side of deformed grid tab 230 or 240.

Referring to FIGS. 5 and 6, a horizontal elongated plunger 500 is slidably disposed between first leg 390 and anvil block 470 for exerting a compressive force against grid tab 240. Plunger 500 comprises an elongated cylindrical first shank portion 510 slidably extending at one end thereof through second bore 450 and further comprises an elongated cylindrical second shank portion 520 having a second bolt hole 522 transversely therethrough, which second shank portion 520 is integrally connected to the other end of first shank portion 510, wherein second shank portion 520 obtains a diameter larger than first shank portion 510. Surrounding a portion of first shank portion 510 and interposed between first leg 390 and second shank portion 520 is a helical elastic spring 530 for outwardly biasing plunger 500 away from anvil surface 480.

Figure 8:
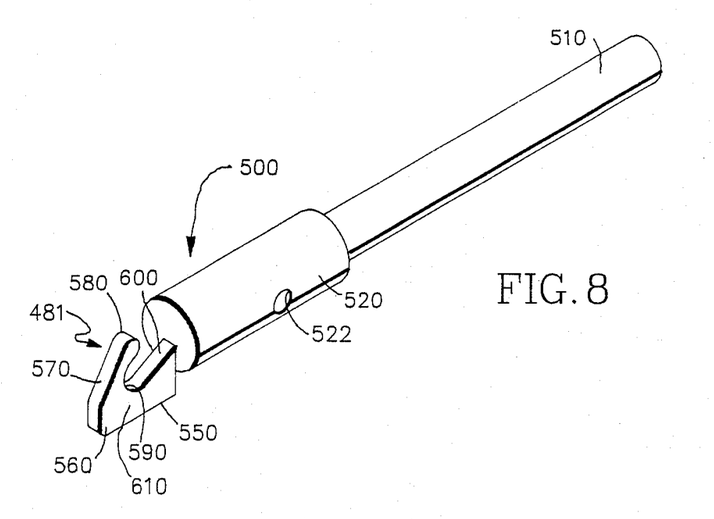
FIG. 8 is a view in perspective of a plunger.

Referring to FIGS. 7 and 8, hook-shaped tab bending member 481, which may be 17-4-PH tool stainless steel, having one end thereof extending through third bore 490, is integrally connected to the terminal end of second shank portion 520 and disposed opposite anvil surface 480 for reforming or bending deformed grid tab 230 or 240 against anvil surface 480. Tab bending member 481 may be approximately 0.65 inch in overall width and approximately 0.80 inch thick. Tab bending member 481 has a horizontal tab bending member base 550, which may be 0.50 inch long, merging into a rounded first corner 560, which may obtain a radius of 0.03 inch. Rounded first corner 560 in turn merges into a first angled portion 570, which may obtain an obtuse angle of 113 degrees with respect to tab bending member base 550. First angled portion 570 merges into a rounded second corner 580, which may obtain a radius of 0.06 inch, for exerting a bending moment against grid tab 230 or 240 when second rounded corner 580 compresses grid tab 230 or 240 against anvil surface 480. Rounded second corner 580 in turn merges into rounded third corner 590, which may obtain a radius of 0.093 inch, which rounded third corner 590 merges into second angled portion 600 which in turn may obtain an acute angle of 28 degrees with respect to tab bending member base 550. Rounded third corner 590 and tab bending member base 550 are configured so that a neck portion 610, which may obtain a minimum width of approximately 0.22 inch, is defined therebetween. Thus tab bending member 481 is formed from a material and is dimensioned in a manner whereby tab bending member 481 is capable of exerting a sufficient bending moment against grid tab 230 or 240 so that grid tab 230 or 240 is reformed or bent against anvil surface 480 without buckling or deforming tab bending member 481 when tab bending member 481 compresses grid tab 230 or 240. As shown in FIGS. 5 and 6, plunger 500 is slidably disposed through second bore 450 and third bore 490 such that one end of first shank portion 510 is slidably disposed through second bore 450 while second shank portion 520 is disposed between the other end of first shank portion 510 and anvil block 470.

Figure 9:
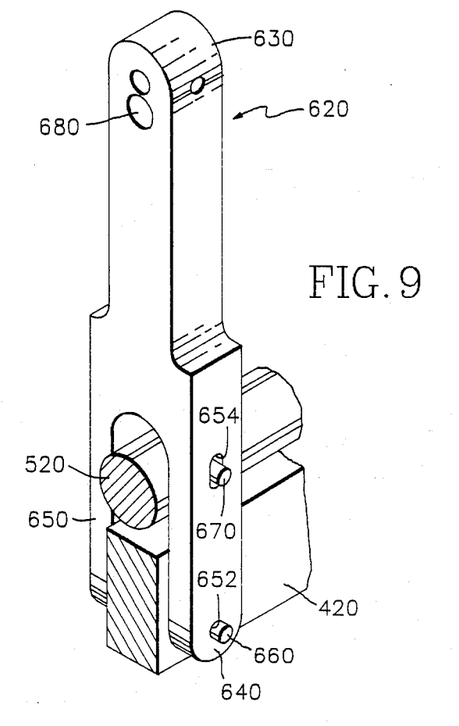
FIG. 9 is a view in perspective showing a lever member.

Referring to FIG. 9, there is illustrated a fork-shaped lever member 620, which may be stainless steel approximately 5.0 inches long and 1.0 inch wide and 0.50 inch thick, comprising an elongated lever handle 630 at one end thereof and further comprising a first tine 640 and a second tine 650 at the other end thereof. Each of first tine 640 and second tine 650 has a first bolt aperture 652 transversely therethrough aligned with first bolt hole 422 and has a second bolt aperture 654 between first bolt aperture 652 and lever handle 630, wherein second bolt aperture 654 is aligned with second bolt hole 522. First tine 640 and second tine 650 are pivotally attached each to opposite sides of second leg 420 by a first bolt 660 extending through first bolt apertures 652 and first bolt hole 422. Moreover, first tine 640 and second tine 650 are fixedly attached each to opposite sides of second shank portion 520 by a second bolt 670 extending through second bolt apertures 654 and second bolt hole 522. Formed through the upper portion of lever handle 630 is a threaded counter bore 680 for receiving an externally threaded stop screw 690 (see FIG. 5) therethrough for stopping the pivoting arc of lever member 620, when lever member 620 pivots about first bolt 660, by impacting the surface of first leg 390 (see FIG. 4) when lever member 620 pivots about first bolt 660. Moreover, extending through cable guide tube 440 and attached to lever handle 630 between counter bore 680 and the end of lever handle 630 is one end of first cable 290 (see FIG. 5), which has the other end thereof engaging first pulley 280. When first pulley 280 is cranked by cranking first pulley handle 282, thereby placing first cable 290 in sufficient tension, lever handle 630 pivots about first bolt 660 towards first leg 390 until stop screw 690 stops the pivoting motion of lever member 620 when stop screw 690 impacts first leg 390. As lever member 620 pivots about first bolt 660 towards first leg 390, plunger 500 slidably translates in second bore 450 and third bore 490 towards first leg 390 thereby translating tab bending member 481 towards anvil surface 480 so that grid tab 230 or 240 is bent against anvil surface 480 when grid tab 230 or 240 is interposed between tab bending member 481 and anvil surface 480. When first pulley handle 282 is released, tension in first cable 290 is released, thereby allowing spring 530 to bias tab bending member 481 away from anvil surface 480 for positioning tab bending member 481 to receive another deformed grid tab 230 or 240.

Figure 10:
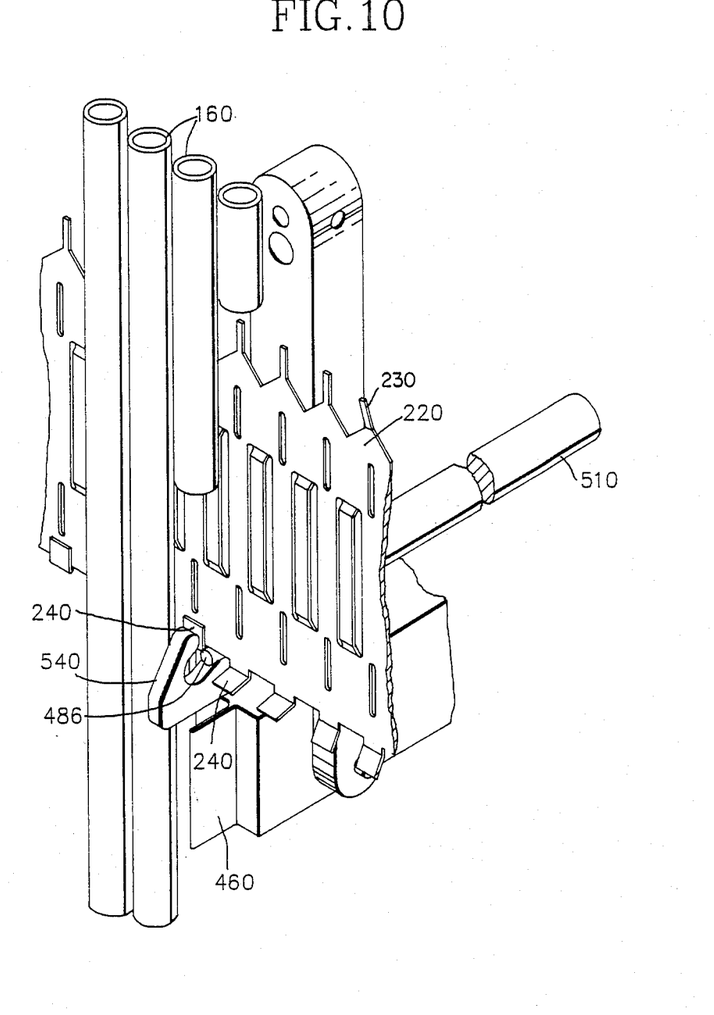
FIG. 10 illustrates the fine alignment of a grid tab bending member with the fuel assembly grid strap for bending a fuel assembly grid tab formed on the grid strap.

Referring to FIG. 10, register pins 486 are shown engaging an edge of grid strap 220 and alignment blade 460 is shown interposed between two fuel rods 160 for aligning tab bending member 481 so that deformed grid tab 240 may be reformed. As indicated above, register pins 486 are sized such that register pins 486 matingly engage the edge of grid strap 220 on either side of deformed grid tab 230 or 240. A television camera (not shown) located near grid strap 20 and electrically connected to a remote television monitor may be used for remote monitoring of the placement of repair tool 250 near grid strap 220 and the fine alignment of grid tab bending member 481 proximate grid tab 230 or 240.

During operation, movable crane 350 is positioned above the spent fuel pool which has fuel assembly 100 disposed therein. Fuel assembly 100 is then moved to near the vertical axis of movable crane 350 and to below movable crane 350. Next, movable crane 350 is laterally swivelled about its vertical axis until repair tool 250 is positioned proximate fuel assembly 100 which contains grid tab 230 or 240 requiring reformation. Next, second pulley handle 370 is cranked so that support assembly 260 and thus repair tool 250 is either lowered or raised by second cable 330 for positioning repair tool 250 proximate grid strap 220 having deformed grid tab 230 or 240 thereon. The combination of movements described above comprising moving fuel assembly 100 to near movable crane 350, swivelling movable crane 350 and cranking second pulley handle 370 may be repeated so that alignment blade 460 is interposed between two fuel rods 160 each adjacent either side of deformed grid tab 230 or 240, and so that register pins 486 each abut the edge of grid strap 220 on either side adjacent deformed grid tab 230 or 240 in the manner illustrated in FIG. 10. Although the movements of fuel assembly 100, movable crane 350 and second pulley handle 370 obtain the gross alignment of repair tool 250 with deformed grid 230 or 240, the placement of alignment blade 460 and register pins 486 obtain fine alignment of bending member 481 with deformed grid tab 230 or 240 for properly bending grid tab 230 or 240. After bending member 481 is positioned proximate grid tab 240, second cable 330 is gently tensioned thereby applying a relatively small upwardly force on elastic means 310 which is connected to support assembly 260. The relatively small upwardly force applied to elastic means 310 is thus translated from elastic means 310 through support assembly 260 to repair tool 250 for gently abutting register pins 486 against the edge of grid strap 220 when grid tab 240 is reformed.

After bending member 481 is aligned with grid tab 230 or 240, first cable 290 is tensioned by cranking first pulley handle 282. When first cable 290 is thusly tensioned, lever member 620 pivots about first bolt 660 towards first leg 390 until stop screw 690 impacts first leg 390. As lever member 620 pivots about stop screw 690, plunger 500 slidably translates through second bore 450 and third bore 490 thereby translating tab bending member 481 towards anvil surface 480 when grid tab 240 is interposed between anvil surface 480 and tab bending member 481. When tab bending member 481 translates towards anvil surface 480, tab bending member 481 contacts grid tab 240 and exerts a bending moment thereon for bending or reforming grid tab 240 against anvil surface 480. After grid tab 240 is sufficiently bent in the manner described immediately above, first pulley handle 282 is again cranked such that first cable 290 is detensioned thereby releasing lever member 620. When lever member 620 is released, spring 530, which surrounds first shank portion 510, biases plunger 500 away from first leg 390 thus biasing tab bending member 481 outwardly from anvil surface 480. After tab bending member 481 is biased outwardly from anvil surface 480, tab bending member 481 is simultaneously biased away from grid tab 240 thus positioning tab bending member 481 for receiving another deformed grid tab between tab bending member 481 and anvil surface 480. After grid tab 240 is reformed, repair tool 250 may be removed from near fuel assembly 100 in a manner that is the reverse process of its initial positioning for bending grid tab 240. Moreover, repair tool 250 may be reversed 180 degrees for reforming grid tab 230 by disengaging first threads 285 from the external threads disposed on support pipe 270, rotating repair tool 180 degrees and then engaging second threads 287 with the external threads disposed on support pipe 270 and substantially repeating the bending process described above.

Therefore, this invention provides a reversible fuel assembly grid tab repair tool having a bending member for remotely reforming deformed fuel assembly grid tabs, wherein the tool has means for fine alignment of the bending member with the grid tab to be reformed.

What is claimed is:

1. A remotely operable grid tab repair tool for bending an elongated nuclear fuel assembly grid tab, comprising:
    (a) a frame having an anvil surface;
    (b) bending means connected to said frame for bending the grid tab against the anvil surface when said bending means is urged against the grid tab;
    (c) positioning means connected to said frame for positioning said bending means opposite the grid tab;
    (d) a lever member pivotally connected to said frame and attached to said bending means for urging said bending means against the grid tab when said lever member is pivoted, said bending means capable of exerting a bending moment on the grid tab when said bending means is urged against the grid tab, whereby the grid tab bends when said bending means is urged against the grid tab by the pivoting action of said lever member; and
    (e) biasing means interposed between said frame and said bending means for biasing said bending means away from the anvil surface.

2. A remotely operable fuel assembly grid tab repair tool for bending a grid tab attached to a grid strap connected to a nuclear fuel assembly grid, comprising:
    (a) a frame having an anvil surface thereon and having a bore therein;

(b) an elongated member having one end slidably extending into the bore;

(c) tab bending means connected to another end of said elongated member for bending the grid tab when said tab bending means is biased against the grid tab;

(d) positioning means connected to said frame, said positioning means capable of positioning said tab bending means opposite the grid tab;

(e) a lever member pivotally connected to said frame and attached to said elongated member for slidably urging said elongated member into the bore, said lever member capable of urging said tab bending means against the grid tab when said lever member is pivoted, said tab bending means capable of exerting a bending moment on the grid tab when said tab bending means is urged against the grid tab, whereby the grid tab bends when said elongated member is urged against the grid tab by the pivoting action of said lever member; and (f) biasing means interposed between said frame and said tab bending means for biasing said tab bending means away from the grid tab.

3. The fuel assembly grid tab repair tool according to claim 2, further comprising a coupling means attached to said frame for connecting said frame to a movable crane, the crane capable of positioning said frame near the fuel assembly.

4. A remotely operable fuel assembly grid tab repair tool for bending a grid tab attached to a grid strap connected to a nuclear fuel assembly grid, comprising:

(a) a frame having a bore therein, said frame having an anvil surface thereon and having a first end and a second end;

(b) an elongated member having one end slidably extending through the bore;

(c) a hook-shaped tab bending member connected to another end of said elongated member for bending the grid tab against the anvil surface;

(d) positioning means connected to said frame, said positioning means capable of contacting a fuel assembly for positioning said tab bending member opposite the grid tab;

(e) a lever member pivotally connected to said elongated member for slidably urging said elongated member into the bore, said lever member capable of urging said tab bending member against the grid tab when said lever member is pivoted, said tab bending member capable of exerting a bending moment on the grid tab when said tab bending member is urged against the grid tab, whereby the grid tab bends when said elongated member is urged against the grid tab by the urging action of said lever member; and (f) biasing means interposed between said frame and said tab bending means for biasing said tab bending means away from the anvil surface.

5. The fuel assembly grid tab repair tool according to claim 4, further comprising:

(a) first coupling means attached to the first end of said frame for connecting said frame to a movable crane, the crane capable of positioning said frame near the fuel assembly; and (b) second coupling means attached to the second end of said frame for connecting said frame to the crane, whereby either the first coupling means or the second coupling means is connected to said frame.

6. A fuel assembly grid tab repair tool for bending a grid tab attached to a grid strap surrounding a bundle of fuel rods, the grid strap connected to a fuel assembly grid, comprising:

(a) a generally L-shaped frame having a first leg having a first end and a second end and having a second leg perpendicular to the first leg, the first leg having a first bore and a second bore therethrough parallel with the second leg, the second leg having a third bore therethrough aligned with the longitudinal axis of the second bore, the second leg having an anvil surface on the terminal end thereof;

(b) an elongated member having one end slidably extending through the second bore and the third bore;

(c) a hook-shaped, grid tab bending member connected to another end of said elongated member for bending the grid tab against the anvil surface;

(d) positioning means connected to said frame, said positioning means capable of matingly abutting an edge of the grid strap for positioning said tab bending member opposite the grid tab;

(e) a lever member pivotally connected to said frame and attached to said elongated member for slidably urging said elongated member into the second bore and into the third bore, said lever member capable of urging said tab bending member against the grid tab when a force is applied against said lever member and when said tab bending member is positioned opposite the grid tab, said tab bending member exerting a bending moment on the grid tab when said tab bending member is urged against the grid tab, whereby the grid tab bends when said elongated member is urged against the grid tab by the pivoting action of said lever member; and (f) biasing means interposed between said frame and said tab bending member for biasing said tab bending member away from the anvil surface.

7. The fuel assembly grid tab repair tool according to claim 6 further comprising:

(a) first coupling means attached to the first end of said first leg for connecting said frame to a movable crane, the crane capable of positioning said frame near the fuel assembly; and (b) second coupling means attached to the second end of said first leg or connecting said frame to the crane.

8. The fuel assembly grid tab repair tool according to claim 6 wherein said biasing means is a compressible spring surrounding said elongated member for biasing said tab bending member away from the anvil surface, said spring interposed between said frame and said elongated member.

9. The fuel assembly grid tab repair tool according to claim 6, wherein said positioning means is at least two pins attached to said anvil surface, said pins extending outwardly from the anvil surface and matingly abutting the edge of the grid strap for fine alignment of said tab bending member proximate the grid tab.

10. The fuel assembly grid tab repair tool according to claim 9, wherein said pins are cylinders.

11. The fuel assembly grid tab repair tool according to claim 9, wherein said pins are elongated rectangles having a generally rectangular cross section.

12. The fuel assembly grid tab repair tool according to claim 9, wherein said pins are elongated triangles having a generally triangular cross section.

13. The fuel assembly grid tab repair tool according to claim 6, wherein said tab bending member is 17-4-PH tool stainless steel.

14. The fuel assembly grid tab repair tool according to claim 6, further comprising an alignment blade outwardly extending from the anvil surface, said alignment blade capable of being matingly inserted between two of the fuel rods near the grid tab for fine alignment of said tab bending member proximate the grid tab.

15. The fuel assembly grid tab repair tool according to claim 13, wherein said alignment blade is an elongated rectangle.

16. The fuel assembly grid tab repair tool according to claim 6, wherein the lever member is forked having at least two tines formed at one end thereof, each of the tines pivotally attached each to opposite sides of said second leg, and said lever member having each of the tines thereof attached each to opposite sides of said elongated member.

17. The fuel assembly grid tab repair tool according to claim 16, further comprising:
(a) cable means having one end connected to said lever member for pivoting said lever member toward said frame thereby urging said tab bending member against the grid tab for bending the grid tab; and
(b) stop means mounted on said lever member for stopping the pivoting motion of said lever member when the other end of said lever member is pivoted toward said frame.

* * * * *